Dec. 3, 1929.   J. ORNSTEIN   1,738,195
ELECTRICAL CONDENSER
Filed April 15, 1925   2 Sheets-Sheet 1
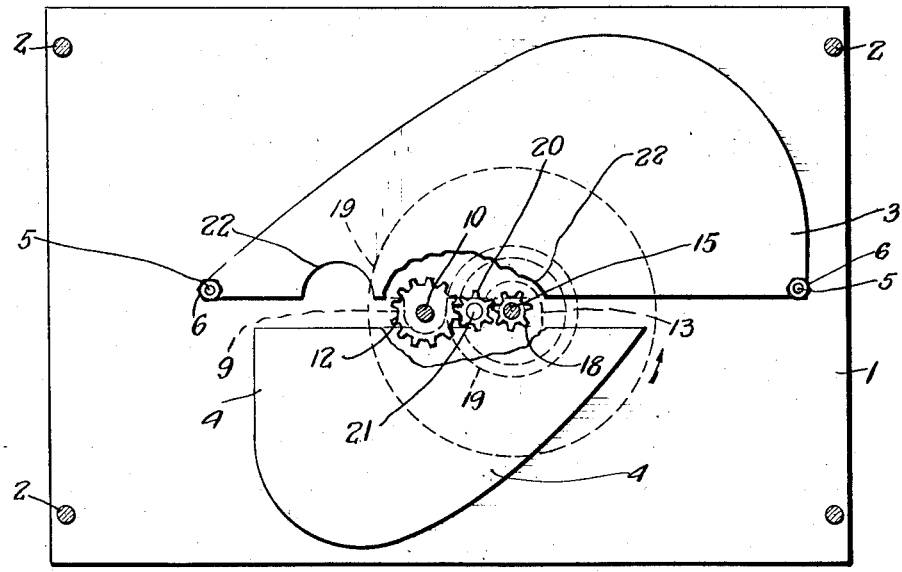
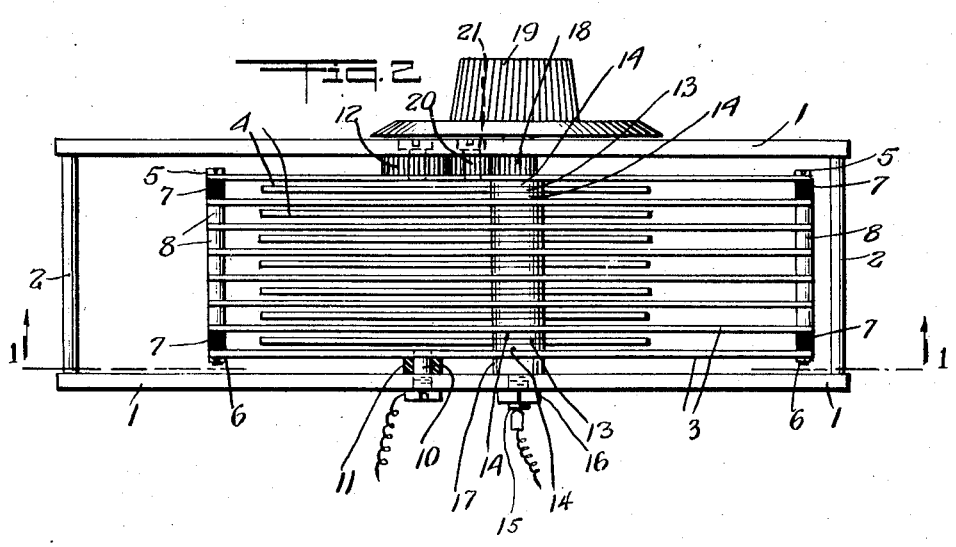
INVENTOR
JACQUES ORNSTEIN
BY
Van Deventer Nickel
ATTORNEYS Dec. 3, 1929.  J. ORNSTEIN  1,738,195
ELECTRICAL CONDENSER
Filed April 15, 1925   2 Sheets-Sheet 2
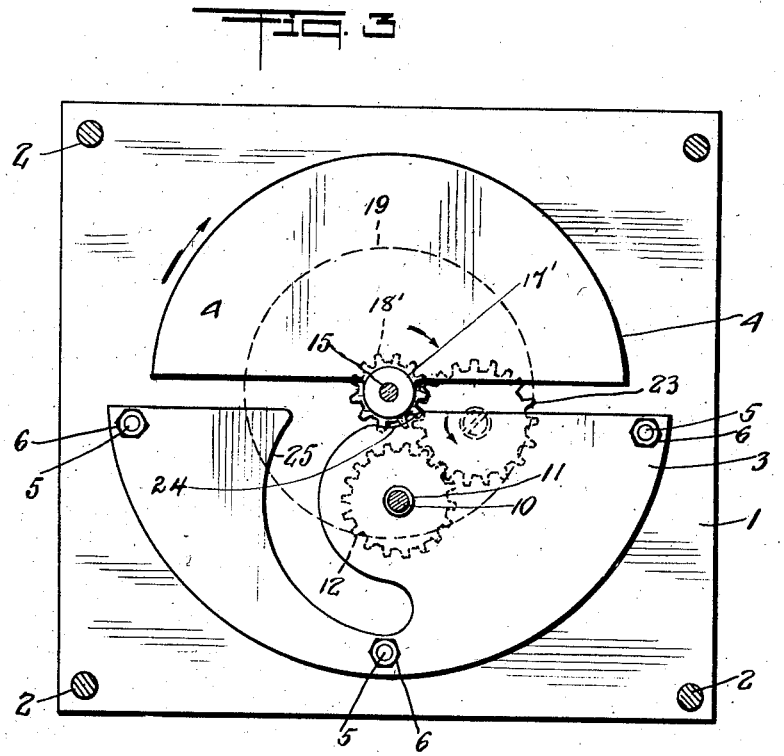
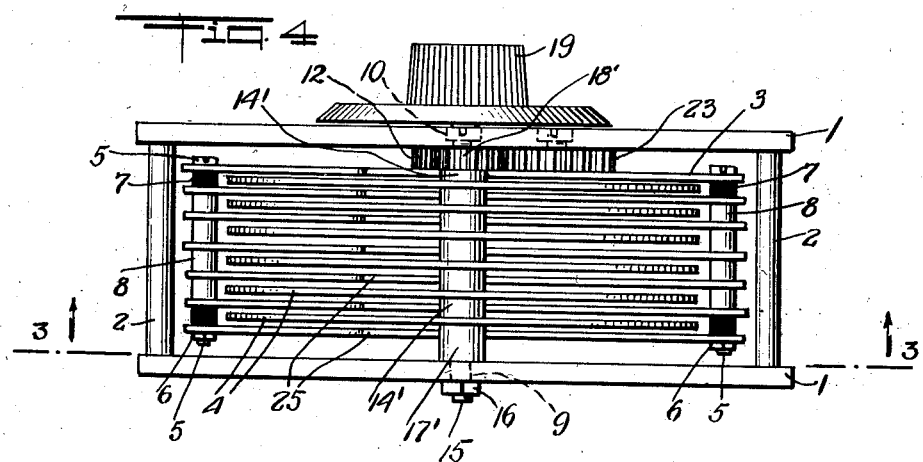
INVENTOR
JACQUES ORNSTEIN
BY
Van Deventer & Hickel
ATTORNEYS Patented Dec. 3, 1929

1,738,195

UNITED STATES PATENT OFFICE

JACQUES ORNSTEIN, OF HAMILTON BEACH, NEW YORK, ASSIGNOR TO DUBILIER CONDENSER CORPORATION, OF NEW YORK, N. Y., A CORPORATION OF DELAWARE

ELECTRICAL CONDENSER

Application filed April 15, 1925. Serial No. 23,336.

This invention relates to improvements in electrical condensers; especially condensers of variable capacity.

An object of this invention is to provide an electrical condenser which can be adjusted to vary its capacity to a very fine and precise degree; and which further comprises relatively few parts and is of superior simplicity of construction.

The nature and scope of the invention will appear from the following description taken with the drawings which show some embodiments of the principle; but the construction actually presented may be, of course, varied within the limits permitted by the broad and general meanings of the terms in which the appended claims are expressed.

On the drawings,

Figure 1 is a front view of a condenser according to my invention viewed as if a section were taken along the line 1—1 of Figure 2;

Figure 2 is a top plan of such a condenser;

Figure 3 is a view similar to Figure 1, but taken along the line 3—3 of Figure 4, showing a modification; and Figure 4 is a top plan of such modification.

The same numerals identify the same parts throughout.

The condenser is made up of a framework or support comprising front and back plates 1 secured together in proper position by means of connecting bars 2 which may be made fast at their opposite ends to the plates 1 in any convenient fashion. In this framework the elements or plates constituting the body of the condenser or condenser proper are adjustably mounted. Such plates are arranged in two groups, one of which is indicated at 3, and the other at 4, so connected that they can be moved in unison to the desired position. These plates 3 and 4 can have any desired shape or size and both sets or groups can be rotated, each about an axis of its own, in the supporting framework, so that the desired adjustment of the condenser can be very precisely obtained.

The plates 3 are shown as parallel to each other, and spaced apart. They preferably have the form of a single structural unit and are held together at their ends by means of binding screws or other fastening devices 5 passing through openings in the plates, the screws having heads at one end and being threaded to receive nuts 6 at the other. Between the adjacent plates 3 are washers or spacing sleeves shown at 7 and 8, these sleeves encircling the binding screws or bolts 5, and holding the plates 3 at the required distance from one another. The sleeves 7 and 8 may be of either insulation or some conducting material, but all the movable plates 3 should be connected together either by metallic sleeves 8, or by a good contact between each of the plates 3 and the screws 5 in the holes of the plates 3 through which the screws 5 pass. The two plates at the ends of the group 3 are further provided with projections 9 extending from one edge and perforated to receive the ends of journals 10 in the opposite plates 1 and about these journals the plates 3 can be swung as an axis.

The journals 10 may be provided by screws engaging openings in the plates 1 of the framework, but being smooth at their ends and entering smooth apertures in the projections 9. Between one of the end plates of the group 3 and the adjacent plate 1 of the framework, the journal 10 may be encircled by a spacing sleeve 11 and between the other end plate of the group 3, and the other plate 1 of the framework, the remaining journal 10 may be encircled by a gear 12 which turns freely on the journal 10, but is made fast to the adjacent plate 3. Preferably, the plates 1 should be of insulation and the plates 3 may be united to one end of an electric circuit by connecting a lead to either of the screws 10.

The other group of plates 4 all have projections 13 at the edge, these projections being perforated; and engaging both faces of the projections 13 are insulating washers 14 which keep the plates 4 out of electrical connection with the plates 3. Through the perforated projections 13 and washers 14 is passed an operating stem 15 mounted in bearing apertures in the plate 1 and threaded at one extremity to receive a holding nut 16. On this operating stem 15 between the plate 1 engaged by the nut 16 and the nearest washer 14, may be placed an insulated spacing sleeve 17, while upon the opposite end of the same stem and between the other plate 1 and the adjacent plate 3 may be mounted and secured to rotate therewith, a gear 18. This gear may be wide enough to fill the space between the adjacent plate 1 and the adjacent washer 14, so as to hold the other group of plates 4 in proper position, or another spacing sleeve may be inserted between the gear 18 and the adjacent washer 14, if desired. As illustrated in Figure 2, each plate 4 must be located between two adjacent plates 3 and the plates 4 are movable in the spaces between the adjacent plates 3, but must not ever make contact with them.

The extremity of the stem 15 bearing the gear pinion 18 projects through the adjacent plate 1 and carries adjacent the outer face of said plate an operating member 19. I also mount on the plate 1 which lies adjacent the knob 19, an idler gear 20 which meshes with the gears 12 and 18 and is carried upon a journal 21, in said plate 1. Of course, the gears 12, 18, and 20 should preferably be of some insulating material so that the electrical separation of the plates 3 and 4 may be maintained. The plates 4 may be connected to an electric circuit by uniting them to a lead or conductor as by arranging a brush to make contact with one end of the stem 15 or by affixing a wire to them in any other suitable way. Of course, all the plates 4 should be united to one another as by causing the stem 15 to make a tight fit with the perforations in the projections 13.

In practice, the gear 12 should be larger than the gear 18 and to adjust the condenser and obtain any capacity required, one simply turns the knob 19. Starting with the position shown in Figure 1, the operator has the capacity of the condenser at its minimum. On the rotation of the knob 19 in the direction indicated by the arrow in Figure 1, both sets or groups of plates 3 and 4 are revolved in a counter-clockwise direction about their separate axes, but the plates 4 rotate more rapidly than the plates 3, thus a greater and greater portion of the area of the plates 4 is moved into the spaces between the plates 3, and the capacity of the condenser is gradually increased.

If the ratio of the gears 18 and 12 is one-half, then by the time the plates 3 have been moved through half a revolution, the plates 4 will have been rotated through a complete revolution back to the position which Figure 1 shows, and the maximum portion of the area of the plates 4 will lie in the spaces between the plates 3; thus making the capacity of the condenser the greatest that can be secured.

If desired, the edges of the plates 3, which in the extreme positions of these plates come closest to the washers 14, on the stem 15, may be recessed as indicated at 22 to permit the plates 3 to be adjustable through the full half of a circle.

With this construction, the capacity of the condenser can not only be adjusted within the usual limits, but also a very precise variation can be obtained such as is ordinarily possible only with condensers that have a so-called vernier attachment of some kind. This result is due to the fact that the two sets of plates 3 and 4 really have a differential movement; that is to say, when the plates 4 are moved, the plates 3 are moved also and the relative displacement of the two sets of plates is merely the difference between the degrees of movement of each set, thus a very precise and fine variation in the capacity can be obtained.

In the modification shown in Figures 3 and 4, the construction and mode of operation is similar only the three gear wheels are not in line with each other.

The plates 3 are secured together as before by bolts or screws 5 and nuts 6, and the exterior or outer plates 3 are mounted by means of screw journals 10, one of these journals carrying a gear 12 as before fixed to the adjacent plate 3. The other set of plates 4 is carried upon an operating stem 15 and made fast in any suitable way, to make them rigid with the stem, one end plate of this group being spaced from the framework by a sleeve 17', and the other end being spaced from the framework by means of a gear 18', and a washer 14', washers 14' also being located between each pair of adjacent plates 4. To connect the gears 12 and 18', I mount a gear 23 on the inner face of the plate 1 of the framework, which is associated with the other two gears 12 and 18', and in mesh with both. Hence, when the knob 19 is turned, the two groups or sets of plates 3 and 4 will again be operated in the manner described above. The plates 3 may be recessed as shown at 24 adjacent the spacing washers 14' and each plate 3 may be provided with a semi-circular slot 25 laid out from the axis of the two journals 10 as a center; this slot being wide enough to clear the diameters of the washers 14'.

To operate and adjust this condenser, the knob 19 is turned and as the two gears 18' and 12 are of different sizes, a different amount of displacement will be given to the two sets of plates 3 and 4 accordingly. Suppose the gear 18' is half as big as the gear 12. Then starting from the position shown in Figure 3, with the capacity of the condenser at its minimum, the operator may turn the knob 19 to move the two sets of plates in the directions shown by the arrows in Figure 3. The plates 4 will, of course, move twice as fast as the plates 3 and when these plates 4 have passed through half a revolution, the plates 3 will have completed only a quarter of a turn, and the axis of the stem 15 will lie about midway of the slots 25 in the plates 3. A further half turn of the plates 4 back to the position shown in Figure 1 will carry the other plates 3 through a further quarter turn, and the plates 3 and 4 will then be as close together as they can be brought, thus making the capacity of the condenser a maximum. Adjustment can easily be obtained for all intermediate values and the same precision or fineness in varying the capacity of the condenser can be secured as with the construction of Figures 1 and 2.

A condenser of this type is exceedingly simple, and will afford all of the fine adjustments that have heretofore been obtained only with much more complicated condensers, including a much larger number of parts.

Having described my invention, what I believe to be new and desire to secure and protect by Letters Patent of the United States is:—

1. A variable condenser comprising a support, an element of one polarity movably mounted in said support, a second element of opposite polarity also movably mounted in said support and cooperating with the first-named element, an operating member and driving means between said member and said elements so that when the member is actuated all of the elements are moved in unison, the driving means having different relative ratios whereby one element moves faster than the other.

2. A variable condenser comprising a support, an element of one polarity rotatably mounted in said support, an element to be of opposite polarity also rotatably mounted in said support and cooperating with the first-named element, an operating member and driving means between said member and said elements so that when the member is actuated all of said elements are revolved in unison, the driving means having different relative ratios whereby one element moves faster than the other.

3. A variable condenser comprising cooperating, movable electrodes of opposite polarity, and a means for simultaneously moving each of the electrodes of opposite polarity at a different speed in such manner that the variation in capacity is dependent upon the difference between the speeds of opposite electrodes.

4. A variable condenser comprising an insulating support, electrodes of opposite polarity rotatably mounted on shafts on said support, said shafts being spaced laterally, a driving means for one shaft to rotate the electrodes of one polarity in a given direction, a driven means for another shaft in operative relation to said driving means whereby the other electrodes are caused to rotate in the same direction to cause the respective electrodes to overlap to a variable degree.

5. A variable condenser comprising an insulating support, interleaved conductive plates of opposite polarity rotatably mounted on shafts on said support, said shafts being spaced laterally, a driving means for one shaft to rotate the plates of one polarity in a given direction, a driven means for another shaft in operative relation to said driving means whereby the other plates are caused to rotate simultaneously in the same direction at a different speed to cause the respective plates to overlap to a variable degree.

6. A variable condenser comprising an insulating frame, cooperating electrodes of opposite polarity rotatably mounted on shafts in said frame, said shafts being spaced apart and connected by a driving train having a predetermined ratio whereby the electrodes of one polarity are rotated simultaneously with, but faster than the electrodes of opposite polarity, and a driving means for said train.

7. A variable condenser comprising movable electrodes of opposite polarity in operative relation, and means for simultaneously moving each of the electrodes of opposite polarity in the same direction and at a different speed to vary the area of overlap between the plates in such manner that the rate of change of capacity depends upon the difference between the speeds of opposite electrodes.

8. A variable condenser comprising movable plates of opposite polarity in operative relation, an operating member, and driving means between the plates and said member adapted to cause simultaneous movement of the plates, the driving means having different ratios whereby a given degree of movement of the operating member causes the plates of one polarity to be moved farther than the remaining plates.

9. A variable condenser comprising rotatable plates of opposite polarity in operative relation, operating means for moving the plates simultaneously in the same direction including driving means having different ratios, whereby a given degree of movement of the operating means causes the plates of one polarity to be moved farther than the plates of opposite polarity.

Signed at New York, in the county of New York and State of New York, this 31st day of March A. D. 1925.

JACQUES ORNSTEIN.